H. H. BALDING.
COMBINED CORN-PLANTER AND CULTIVATOR.
No. 173,202. Patented Feb. 8, 1876.
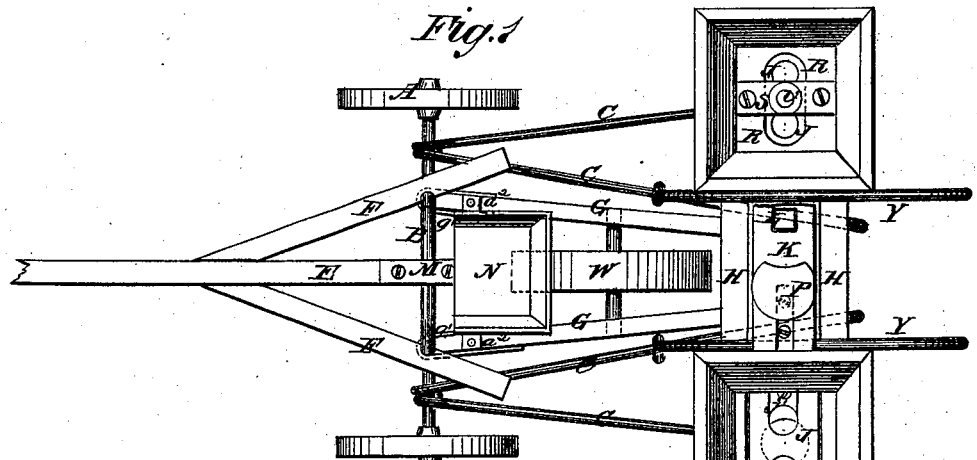
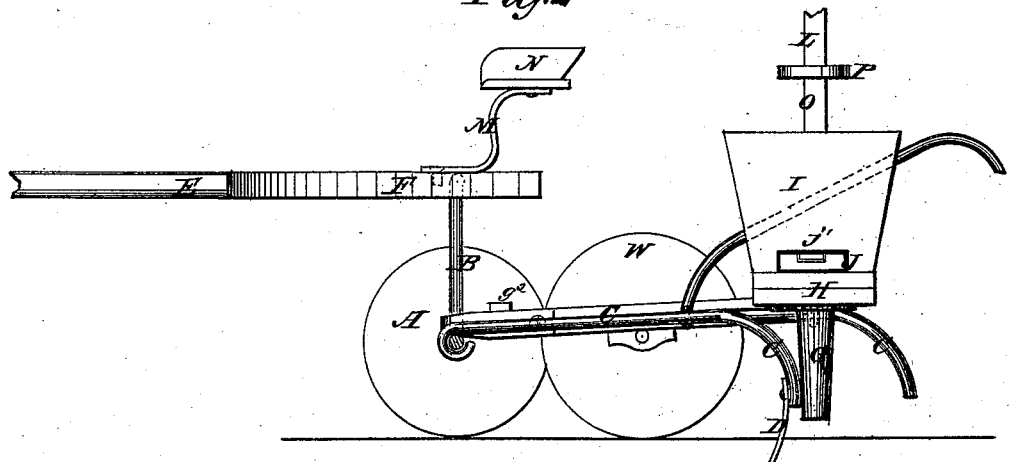
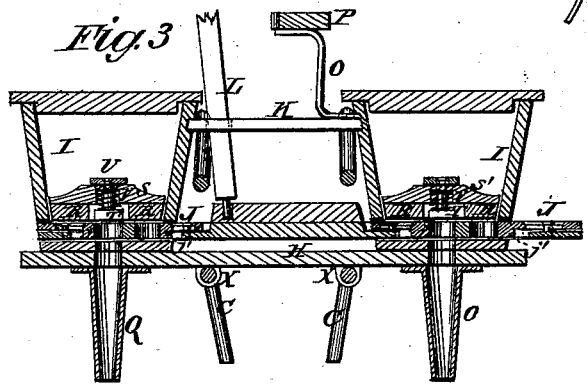
WITNESSES:
Francis McArdle
Alex F. Roberts
INVENTOR:
Henry H. Balding
BY
ATTORNEYS.

UNITED STATES PATENT OFFICE.

HENRY H. BALDING, OF TERRE HAUTE, INDIANA.

IMPROVEMENT IN COMBINED CORN-PLANTERS AND CULTIVATORS.

Specification forming part of Letters Patent No. 173,202, dated February 8, 1876; application filed December 18, 1875.

*To all whom it may concern:*

Be it known that I, HENRY HARISON BALDING, of Terre Haute, in the county of Vigo and State of Indiana, have invented a new and useful Improvement in Combined Corn-Planter and Cultivator, of which the following is a specification:

Figure 1 is a top view of my improved machine. Fig. 2 is a side view of the same, one of the cultivator-wheels being removed. Fig. 3 is a vertical cross-section of the same, taken through the seed-hoppers.

Similar letters of reference indicate corresponding parts.

The object of this invention is to combine a corn-planter with an ordinary cultivator, in such a way that the machine may be used for planting corn, and will do as good work as a machine built wholly as a planter.

A are the wheels of the cultivator, which revolve upon the journals of the axle B. The middle part of the axle B is bent four times at right angles to form a rise, so that the said axle may pass over tall plants without injuring them. C are the plow-beams of the cultivator, the forward ends of which are pivoted or hinged to the end horizontal parts of the axle B, between the wheels A and the first angles of said axle. The rear parts of the beams C are curved downward, and to their lower ends are attached the plows D. The inner beams C, that are next the row of plants being cultivated, are made shorter than the outer beams. E is the tongue, the upper side of the rear end of which is notched to receive the middle horizontal part of the axle B, to which it is secured by the lower part of the spring-standard M. The lower end of the standard M is secured to the tongue, and to its upper end is secured the driver's seat N. The connection between the tongue E and the axle B is strengthened by the braces F, the forward ends of which are beveled off, and are secured to the opposite sides of the tongue E. The inner sides of the rear ends of the braces F are notched to receive and fit upon the upright parts of the axle B, as shown in Figs. 1 and 2. G are two bars, the forward ends of which are connected with the upright parts of the axle B by clevises $g^1$, and the forward parts of which are connected by a cross-bar, $g^2$. To the rear end of the bars G is attached a long and wide cross-bar, H, to the end parts of which are attached the seed-hoppers I. To the inner sides of the upper parts of the hoppers I are attached the ends of a bar, K, through a hole in which passes a lever, L, by which the dropping-slide J is operated, and the lower end of which enters a hole in the said dropping-slide J. To the bar K is attached the spring-standard O of the seat P, for the person that operates the lever L to drop the seed. In the parts of the slide J that enter the hoppers I are formed two holes, which receive the seed and convey it to a hole passing down through the bottom of the hoppers I, and through the bar H. Q are spouts, attached to the lower side of the bar H over the holes through said bar, so as to receive the seed and conduct it to the ground in the rear of the plows D.

The size of the holes in the slide J are regulated by slides $j'$, placed in grooves in the said slide J, so that more or less seed may be dropped for a hill, as may be desired.

In the hoppers I, directly over the dropping-slide J, is placed a false bottom, R, having a slot through its middle part for the seed to pass to the said slide J. To the upper side of the middle part of the false bottom R, and at right angles with its slot, is secured a cross or bridge bar, S. T is a block, which is placed in the slot of the false bottom R, and is attached to the lower end of the bolt U, which passes up through a hole in the cross-bar S, and has a nut screwed upon its upper end. The block T is held down by a spiral spring, V, placed upon the bolt U, with its upper end in a socket in the bar S, and its lower end resting against the block T.

The device S T U V thus serves as a cut-off to prevent any more seed passing out than enough to fill the dropping-holes of the slide J.

The planting device is supported by a wide-faced wheel, W, the journals of which revolve in bearings attached to the bars G. When the planting device is to be attached to the cultivator, the beams of said cultivator are changed, so as to bring the shorter beams to the outside, and the bar H is secured to the inner or longer beams by hook-bolts or staples X passing around said beams, and attached to said bar.

The seed may be covered by the plows of the inner or longer beams; or the said plows may be detached, and the seed covered by the falling in of the soil in the rear of the opening-plows D. Y represents the handles of the cultivator.

Having thus described my invention, I claim as new and desire to secure by Letters Patent—

1. The combination of the frame G H and wheel W of the planter with the axle B and beams C of the cultivator, substantially as herein shown and described.

2. The combination of the clevises $g^1$ and the hook bolts or staples X with the planter-frame G H and the axle B and beams C of the cultivator, substantially as herein shown and described.

HENRY H. BALDING.

Witnesses:
WILLIAM CLUGSTON,
HENRY RUSSELL.